CHARGING BOX FOR A MACHINE FOR OPERATING ON METAL SCRAP

Original Filed Oct. 27, 1958 3 Sheets-Sheet 1

INVENTOR
WALLACE M. THOMPSON

BY Cushman, Darby & Cushman
ATTORNEYS

CHARGING BOX FOR A MACHINE FOR OPERATING ON METAL SCRAP

Original Filed Oct. 27, 1958 3 Sheets-Sheet 2

INVENTOR
WALLACE M. THOMPSON

BY Cushman, Darby & Cushman
ATTORNEYS

CHARGING BOX FOR A MACHINE FOR OPERATING ON METAL SCRAP

Original Filed Oct. 27, 1958 3 Sheets-Sheet 3

INVENTOR
WALLACE M. THOMPSON

BY Cushman, Darby & Cushman
ATTORNEYS

United States Patent Office

Re. 25,268
Reissued Oct. 23, 1962

25,268

CHARGING BOX FOR A MACHINE FOR OPERATING ON METAL SCRAP

Wallace M. Thompson, Cordele, Ga., assignor to Harris Foundry & Machine Co., Cordele, Ga., a corporation of Georgia Original No. 2,932,247, dated Apr. 12, 1960, Ser. No. 769,842, Oct. 27, 1958. Application for reissue Mar. 28, 1961, Ser. No. 98,996
23 Claims. (Cl. 100—95)

Matter enclosed in heavy brackets [ ] appears in the original patent but forms no part of this reissue specification; matter printed in italics indicates the additions made by reissue.

This application relates to an improved charging box for a machine for operating on metal scrap, such as a shear or a baling press. The invention will be described with reference to a charging box for a shear for cutting metal scrap into smaller pieces, but it will be understood that the invention is applicable to charging boxes for other types of machines for operating on metal scrap.

Metal scrap frequently is passed through a shear, usually of the hydraulic type, in order to chop the scrap up into smaller pieces for convenience in further processing. Scrap shears of this nature usually are provided with an elongated charging box into which metal scrap is placed and advanced into the shear by a charging ram the head of which forms an end wall of the box. Charging boxes of this type often are provided with a hinged cover that can be operated to at least partially compress overflowing scrap or scrap too large to fit into the charging box, and thus reduce the scrap into a smaller bundle in order to facilitate feed of the scrap into the shear assembly for cutting.

Charging boxes of the aforedescribed type, however, have various limitations. For example, the cross-sectional size of the box usually must correspond to the size of the opening between the cutting blades of the shear assembly. Consequently, the box cannot receive scrap of a size much larger than that which will pass through the shear, i.e., which will fit within the box, and larger pieces of scrap must preliminarily be reduced in size, usually by cutting with an acetylene torch, before they can be placed in the charging box. In those instances where a charging box is provided with a hinged cover, the box usually can be charged or loaded, with any degree of facility, from one side only, i.e., the side opposite the hinged cover.

Accordingly, it is an object of this invention to provide an improved metal scrap charging box which will take scrap pieces larger than those receivable in a conventional charging box for a shear or other machine of comparable size.

It is another object of this invention to provide an improved metal scrap charging box which will receive and compress over-size bulky scrap into a bundle having smaller cross-sectional dimensions suitable for feeding directly into a shear assembly or other machine for operating on scrap metal.

It is another object of this invention to provide an improved metal scrap charging box which will confine and compress bulky scrap and which has extreme flexibility of movement of its confining parts in order to effect rapid crushing and confinement of bulky scrap.

It is a further object of this invention to provide an improved metal scrap charging box which can be fed or loaded with scrap metal with equal facility from either side of the box, or from both sides of the box, thus allowing more time for accumulation of charges and segregation of metal scrap material.

Other objects and advantages of the invention will be come apparent from the following description and accompanying drawings in which.

Figure 1:
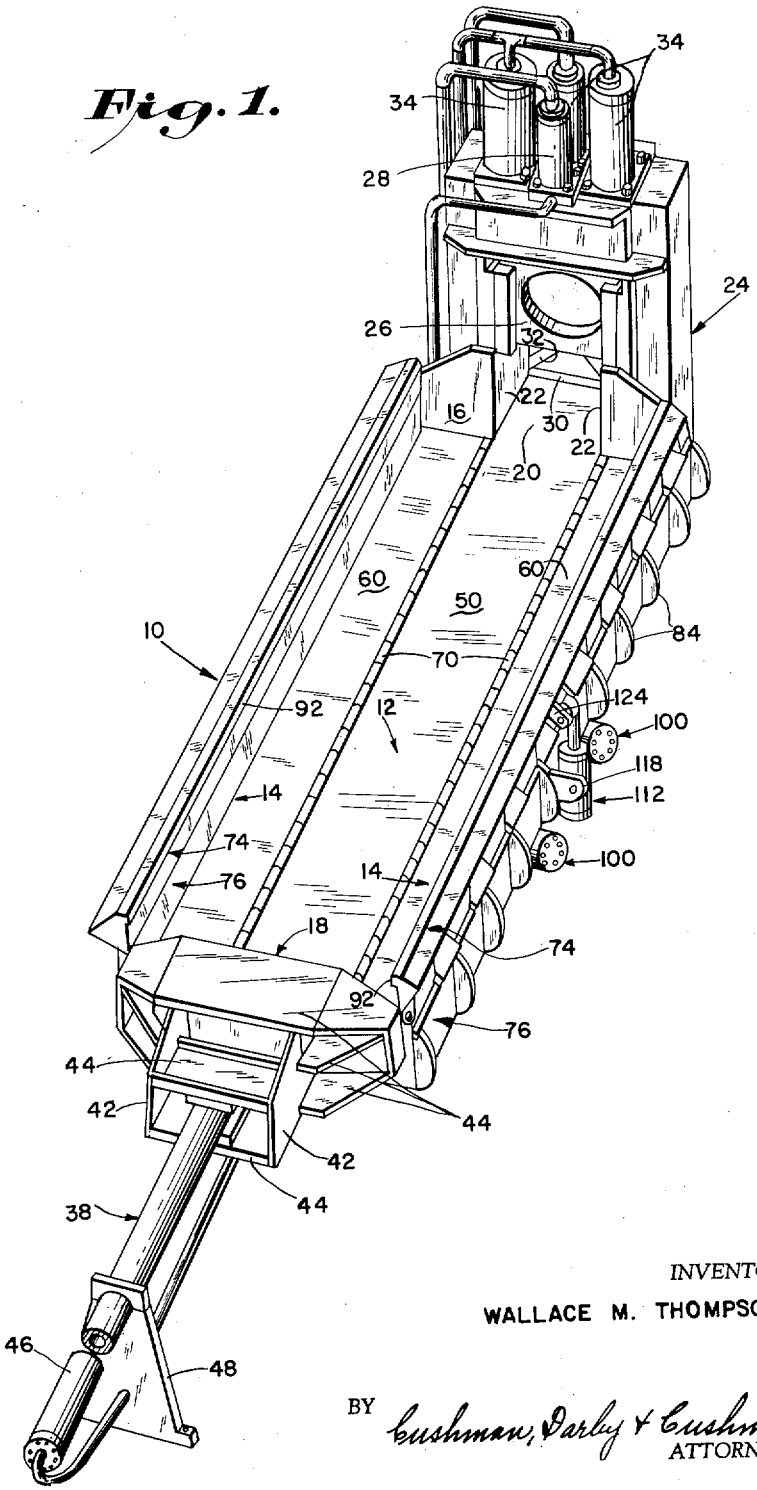
FIGURE 1 is a perspective view of a metal scrap charging box embodying this invention in association with a hydraulic shear for cutting metal scrap into smaller pieces for further processing. The charging box is shown in fully open condition ready to be filled with metal scrap.

Referring now to FIGURE 1 of the drawings, there is shown a metal scrap charging box 10, generally of welded construction, and having an open top; an elongated generally-rectangular, bottom wall 12; normally-generally-upright, opposed and substantially parallel side walls 14, and upright end walls 16 and 18 which overlap the ends of the side walls. The end wall 16 is cut away centrally between its side edges to provide a generally rectangular opening of less width than the wall 16. The bottom wall 12 of the box 10 is provided with an extended portion 20 at and beyond the opening in the end wall 16 to provide, in conjunction with upright side walls 22, an open-topped channel or passageway for feeding metal scrap into a hydraulic shear 24. The shear 24 is provided with the usual vertically-movable hold-down clamp 26 that may be operated by a hydraulic ram 28, and beyond the clamp with a fixed horizontal shear blade 30 that cooperates with a vertical-movable inverted V-shaped shear blade 32 operable by hydraulic rams 34. The shear 24 generally is of conventional construction so no further details thereof need be given here.

The end wall 18 of the charging box 10 opposite the shear 24 is provided with a generally-rectangular wall portion 36 (FIGURE 3) that is in alignment with and corresponds generally in size to the size of the feeding passageway through the wall 16. This end wall portion 36 essentially constitutes the head of a hydraulic charging ram 38 (FIGURES 1 and 2) so that the wall portion 36 can be moved inwardly of the box 10 in order to move scrap from within the box through the feeding passageway and into the shear 24 to be cut to smaller pieces by the latter. The end wall 18 is formed by an inner plate 40 (FIGURE 3) which is reenforced and stiffened by appropriate vertical and horizontal backing plates 42 and 44 which support the inner end of the cylinder 46 of the ram 38. The cylinder 46 also may be supported between its ends by a pedestal-like bracket 48.

Figure 2:
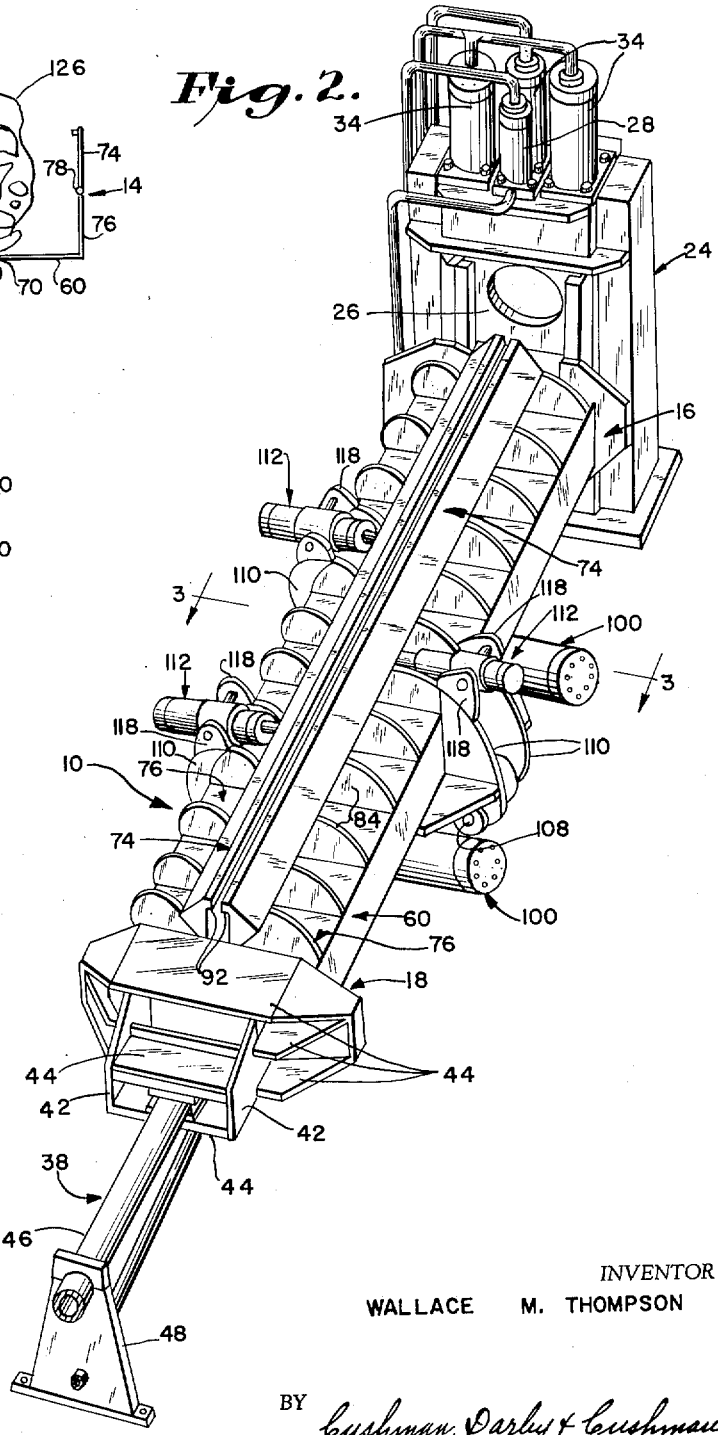
FIGURE 2 is a view corresponding to FIGURE 1, but showing the charging box in its fully closed condition.
Figure 3:
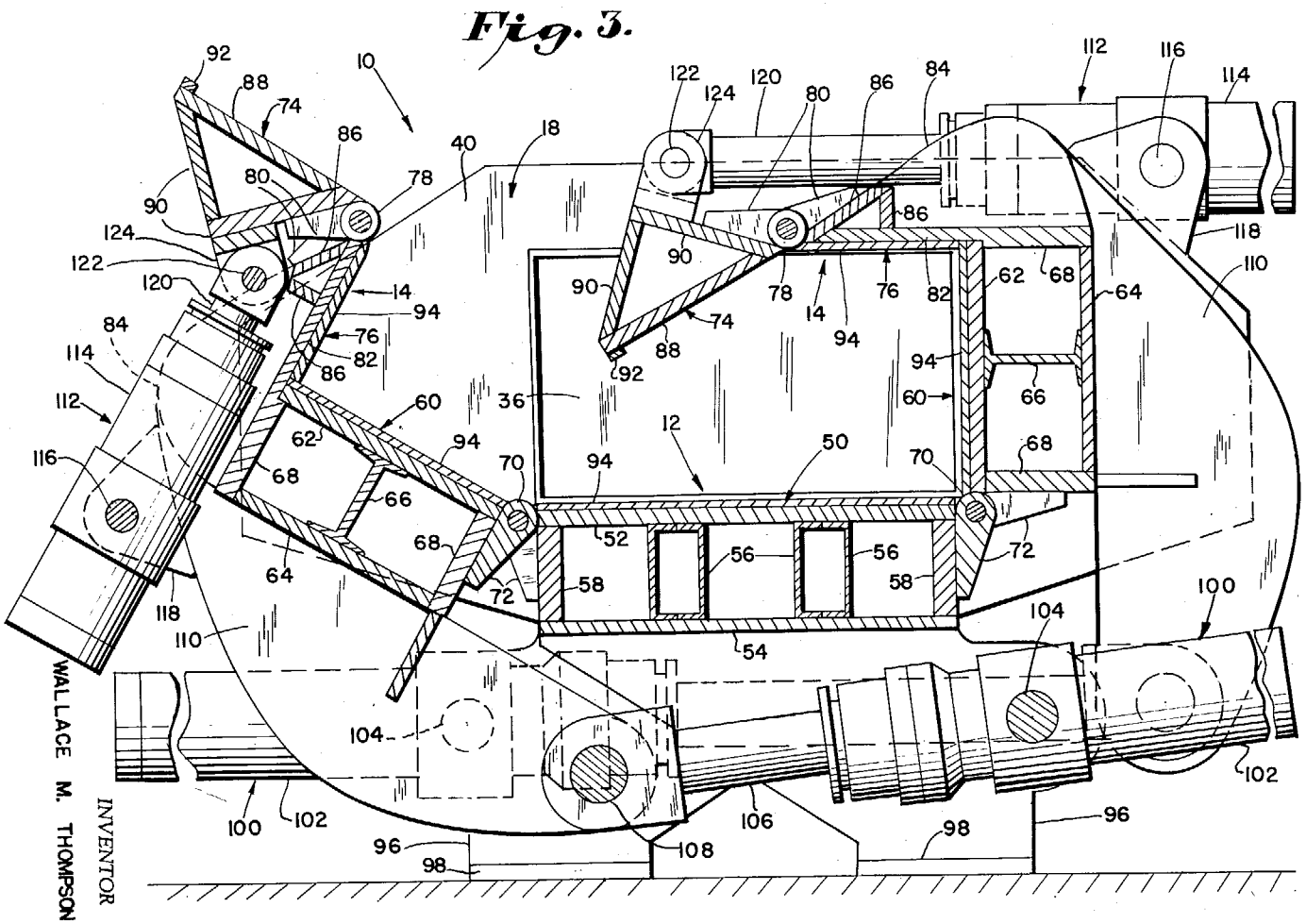
FIGURE 3 is an enlarged sectional view taken substantially on line 3—3 of FIGURE 2, but showing the movable parts of the box in positions different from those shown in FIGURE 2.

The central generally-rectangular strip or portion 50 of the bottom wall 12 that is aligned with the feeding passageway is of box-girder-like construction having inner and outer plates 52 and 54 connected by longitudinally-extending intermediate reenforcing channel members 56 and also by substantially-vertical reenforcing side plates 58, as shown best in FIGURE 3. Those rectangular edge portions or strips 60 of the bottom wall 12 of the charging box 10 which are disposed on either side of the central portion 50 are, for reasons later evident, of widths equal to the height of the end wall movable portion 36 and also of box-girder construction having inner and outer plates 62 and 64 connected by a central reenforcing I beam 66 and reenforcing side plates 68. The edge portions 60 are connected to the central portion 50 by piano hinges 70 having their leaves 72 secured in any appropriate manner, as by welding, to the outer sides of the side plates 58 of the central portion 50 and of the corresponding plates 68 of the two bottom wall edge portions 60. These hinges 70 are arranged to provide for pivotal movement of the bottom wall edge portions 60 from their normal horizontal positions shown in FIGURE 1 to a substantially vertical or upright position, as shown in FIGURE 2 and also at the right-hand side of FIGURE 3.

The side walls 14 of the charging box 10 are each divided into upper and lower rectangular strips or portions 74 and 76, respectively, that are connected together by piano hinges 78 which have their leaves 80 secured in any appropriate fashion, as by welding, to the outer sides of the upper and lower side wall portions 74 and 76. Thus, the piano hinges 78 provide substantially smooth interior surfaces at the junctions between the three bottom wall portions 50 and 60 and also between the two portions 74 and 76 of each side wall 14. For reasons later evident, the height of the lower side wall portions 76 is slightly less than one half the width of the central bottom wall portion 50. The lower side wall portions 76 are formed by extensions 82 of the outer side plates 68 of the bottom wall edge portions 60, and these plates 68 and their extensions 82 are backed by longitudinally-spaced, generally-upright reenforcing and stiffening plates 84. Additionally, adjacent its upper edge, each extension 82 is backed by longitudinally extending stiffening and reenforcing plates 86. The upper portion 74 of each side wall 14 is formed by a plate 88 that likewise is reenforced by longitudinal stiffening plates 90 that are arranged in conjunction with the plate, to form a girder-like construction which is substantially triangular in cross-section. Preferably, the extreme upper edge of each upper side wall portion 74 is provided with an inner longitudinal rib-like projection 92, for reasons later explained.

The hinges 78 are arranged so that each upper side wall portion 74 can be moved to a position inwardly of the box 10 wherein the inner surface of the upper side wall portion is inclined inwardly at an obtuse angle to the plane of the corresponding lower side wall portion 76, as shown at the right-hand side of FIGURE 3. The hinges 78 also permit each upper side wall portion 74 to be pivoted outwardly of the charging box 10 into a position substantially normal to the plane of the corresponding lower side wall portion 76, as shown in FIGURE 2 and at the left-hand side of FIGURE 3. Preferably, the inner surfaces of the bottom wall portions 50 and 60 and of the lower side wall portions 76 of the box are provided with replaceable wear plates 94.

As previously stated, the end walls 16 and 18 of the box 10 overlap the ends of the side walls 14. These end walls 16 and 18 also overlap the ends of the bottom wall edge portions 60. The clearance between the end walls 16 and 18 and the side walls 14 and bottom wall edge portions 60 is quite small so that the side walls and bottom wall edge portions substantially contact the end walls and sweep closely thereadjacent during their pivotal movements. As shown in FIGURE 3, the charging box may be supported upon any appropriate horizontal surface by several, three being shown in the drawing, longitudinally spaced pairs of upright supporting plates 96 that are secured to and disposed transversely beneath the central bottom wall portion 50 of the box 10. At their lower edges the plates 96 are provided with horizontal supporting flanges 98.

Pivotal movement of each bottom wall edge portion 60 of the box 10, together with the entire corresponding side wall 14, is effected by a generally horizontally extending hydraulic ram 100 disposed generally transversely beneath the box and having its cylinder 102 pivotally connected to and between a pair of the supporting plates 96 by trunnions 104. The end of the piston rod 106 of each such ram 100 is pivotally connected as by a transverse pivot pin 108, to and between, a pair of reenforcing and stiffening plates 110 that are secured transversely to the underside of the corresponding bottom wall portion 60 and project inwardly beneath the central bottom wall portion 50. These plates 110 essentially constitute extensions of a pair of the stiffening plates 84 on the corresponding lower side wall portion 76. Likewise, pivotal movement of each upper side wall portion 74 is effected by an independently controllable hydraulic ram 112 that has its cylinder 114 pivotally connected by trunnions 116 to and between a pair of lugs 118 which are welded or otherwise suitably secured to the edges of a pair of the plates 110. The free end of the piston rod 120 of the ram 112 is pivotally connected, by a pivot pin 122, to and between a pair of ears 124 on a lug welded to the outer side of the corresponding upper side wall portion 74.

In the arrangement shown in the drawing, one bottom wall edge portion 60, and the upper portion 74 of the corresponding side wall 14, have only one operating ram 100 and 112 connected respectively thereto, while the other bottom wall edge portion and upper portion of its corresponding side wall are each provided with two hydraulic rams 100 and 112 operable in unison for effecting their pivotal movements. In this type of arrangement, that side of the charging box having its portions 60 and 74 each movable by two rams may be utilized for effecting a greater compressing action.

Figure 4:
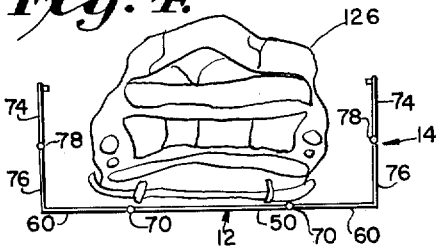
FIGURES 4 to 8 are diagrammatic cross-sectional views illustrating a normal sequence of operations of the charging box illustrated in FIGURES 1 to 3 in compressing and confining metal scrap preliminary to feeding the same to the hydraulic shear.
Figure 5:
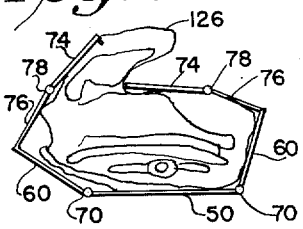

Referring next to FIGURES 4 to 8 of the drawings, there is shown a normal sequence of operations for compressing and confining bulky scrap in the charging box 10. Thus, referring first to FIGURE 4, there is shown the charging box 10 in its fully open condition with an automobile body and frame 126 to be scrapped disposed therein. The first step is to move one of the bottom wall edge portions 60 (on the right as shown in the drawings) upwardly and inwardly by its ram 100, while at the same time moving the upper portion 74 of the corresponding side wall 14 slightly inwardly by its ram 112. At the same time, the opposite bottom wall edge portion 60 is moved upwardly and inwardly to a somewhat lesser extent, as shown in FIGURE 5, so that the automobile body is somewhat preliminarily compressed, such compression taking place principally on the right-hand side, again as shown in FIGURE 5.

Figure 6:
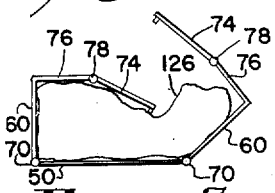
Figure 7:
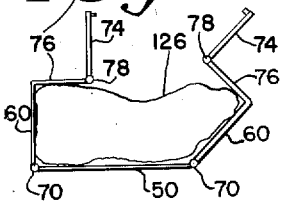
Figure 8:
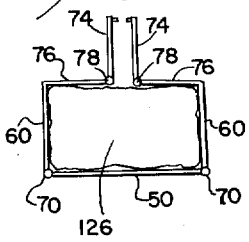

The next step will be to move the right-hand bottom wall edge portion 60 somewhat outwardly so that the opposite bottom wall edge portion can be moved substantially into its upright position in order to complete the confining and compressing of the left-hand side of the automobile body, as shown in FIGURE 6. Thereupon, the upper portions 74 of both side walls are moved to their extreme outward positions, as shown in FIGURE 7, so that the right-hand bottom wall edge portion also can be moved into its upright position in order to completely confine and compress the automobile body 126, as shown in FIGURE 8.

From an inspection of this latter figure, it will be seen that the automobile body 126 has been confined and compressed into an elongated bundle having transverse dimensions not exceeding those of the movable end wall portion 36 which constitutes the head of the charging ram 38. Consequently, the ram 38 readily can push the scrap bundle through the feeding passageway into the shear 24. The passage of the scrap bundle through the feeding passageway can be effected by the charging ram 38 either with the charging box 10 completely closed, as shown in FIGURE 2, or open after the scrap compressing action has been effected. It also will be seen that when the charging box 10 is in its open position, as shown in FIGURES 1 and 4, it can readily be charged or fed with scrap from either side without interference with any subsequently moving parts, such as a hinged lid.

It will be noted that during the preliminary movements of the upper side wall portions 74 to preliminarily confine and compress metal scrap in the charging box 10, the inner longitudinal ribs on the upper edges of the upper side wall portions 74 greatly inhibit any tendency of the metal scrap to "crawl" out of the box.

It will thus be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A charging box for a machine for operating on metal scrap comprising: a box-like receptacle having an open top, a bottom wall, and a pair of opposed upright side walls, said bottom wall including a main portion and an edge portion hinged thereto about an axis parallel to said side walls for pivotal movement between substantially horizontal and substantially upright positions, and one of said side walls including a lower portion fixedly secured to said bottom wall edge portion and an upper portion hinged to said lower portion about an axis parallel to said first-mentioned axis for pivotal movement between a position inclined inwardly from the plane of said lower portion and a position inclined outwardly at an angle of at least 90° from said plane.

2. The structure defined in claim 1 including reciprocating hydraulic motor means connected to the bottom wall portions for pivoting the edge portion, and additional reciprocating hydraulic motor means connected to the side wall portions for pivoting the upper portion.

3. The structure defined in claim 1 in which the receptacle has an upright end wall provided with a generally rectangular portion movable inwardly of the receptacle, the bottom edge of said end wall portion being coextensive with the corresponding end edge of the main bottom wall portion and the height of said end wall portion being substantially equal to the width of the bottom wall edge portion.

4. The structure defined in claim 3 in which the receptacle has another end wall provided with a generally rectangular opening opposite the movable end wall portion, the lower edge of said opening being substantially coextensive with the corresponding end edge of the bottom wall portion and the height of said opening being at least as great as the width of the bottom wall edge portion.

5. The structure defined in claim 4 including reciprocating fluid motor means connected to the movable end wall portion for moving the latter toward and away from the opposite end wall opening.

6. A charging box for a machine for operating on metal scrap comprising: a box-like receptacle having an open top, a bottom wall, a pair of opposed upright side walls, and a pair of opposed upright end walls, said bottom wall including a main portion and an edge portion hinged thereto about an axis parallel to said side walls for pivotal movement between said end walls between substantially horizontal and substantially upright positions, one of said side walls including a lower portion fixedly secured to said bottom wall edge portion and an upper portion hinged to said lower portion about an axis parallel to said first-mentioned axis for pivotal movement between said end walls between a position inclined upwardly from the plane of said lower portion and a position inclined outwardly at an angle of at least 90° from said plane, one of said end walls being provided with a generally rectangular portion movable inwardly of said receptacle, and the other of said end walls being provided with a generally rectangular opening, the bottom edges of said end wall portion and of said opening being coextensive with the corresponding end edges of said main bottom wall portion, the height of said end wall portion being substantially equal to the width of said bottom wall edge portion, and the height of said opening being at least as great as the width of said bottom wall edge portion; reciprocating hydraulic motor means connected to said bottom wall edge portion for pivoting the latter; additional reciprocating hydraulic motor means connected to said side wall upper portion for pivoting the latter; and still additional reciprocating hydraulic motor means connected to said end wall portion for moving the latter toward and away from said opposite end wall opening.

7. A charging box for a machine for operating on metal scrap comprising: a box-like receptacle having an open top, a bottom wall, and a pair of opposed upright side walls, said bottom wall including a central portion and a pair of opposite edge portions hinged to said central portion about axes parallel to each other and to said side walls for pivotal movement between substantially horizontal and upright positions, and said side walls each including a lower portion fixedly secured to a corresponding bottom wall edge portion and an upper portion hinged to said lower portion about an axis parallel to said first mentioned axes for pivotal movement between a position inclined inwardly from the plane of said lower portion and a position inclined outwardly at an angle of at least 90° from said plane.

8. The structure defined in claim 7 in which the bottom wall edge portions are of equal width and the height of each of the lower side wall portions is equal to substantially one half the width of the central bottom wall portion.

9. The structure defined in claim 7 including reciprocating hydraulic motor means connected to the central bottom wall portion and to each of the edge portions for pivoting the latter, independently of each other, and additional reciprocating hydraulic motor means connected to each of the lower side wall portions and to the corresponding upper portion for pivoting the latter independently of each other.

10. The structure defined in claim 7 in which the receptacle has an end wall provided with a generally rectangular portion movable inwardly of the receptacle, the bottom edge of said end wall portion being substantially coextensive with the corresponding end edge of the central bottom wall portion and the height of said end wall portion being substantially equal to the width of the bottom wall edge portions.

11. The structure defined in claim 10 in which the receptacle has another end wall provided with a generally rectangular opening opposite the movable end wall portion, the lower edge of said opening being substantially coextensive with the corresponding end edge of the central bottom wall portion and the height of said opening being at least as great as the width of the bottom wall edge portions.

12. The structure defined in claim 11 including reciprocating fluid motor means connected to the movable end wall portion for moving the latter toward and away from the opposite end wall opening.

13. A charging box for a machine for operating on scrap metal comprising: a box-like receptacle having an open top, a bottom wall, a pair of opposed upright side walls and a pair of opposed upright end walls, said bottom wall including a central portion and a pair of opposite edge portions hinged to said central portions about axes parallel to each other and to said side walls for pivotal movement between said end walls between substantially horizontal and substantially upright positions, each of said side walls including a lower portion fixedly secured to a corresponding bottom wall edge portion and an upper portion hinged to said lower portion about an axis parallel to said first-mentioned axes for pivotal movement between said end walls between a position inclined inwardly from the plane of said lower portion and a position inclined outwardly at an angle at least 90° from said plane, one of said end walls being provided with a generally rectangular portion movable inwardly of said receptacle and the other of said end walls being provided with a generally rectangular opening, the bottom edges of said end wall portion and of said opening being coextensive with the corresponding end edges of said central bottom wall portion, the height of said end wall portion being substantially equal to the width of said bottom wall edge portions, and the height of said opening being at least as great as the width of said bottom wall edge portions; reciprocating hydraulic motor means connected to each of said bottom wall edge portions for pivoting the latter independently of each other; additional reciprocating hydraulic motor means connected to said side wall upper portions for pivoting the latter independently of each other; and still additional reciprocating hydraulic motor means connected to said end wall portion for moving the latter toward and away from said opposite end wall opening.

*14. Apparatus for preliminarily compressing and subsequently cutting into smaller pieces bulky metal scrap comprising: a box-like receptacle having an open top and a pair of opposed side walls at least one of which has a portion movable toward the other; means for moving said one side wall portion toward said other side wall to compress metal scrap in and reduce the width of said receptacle; shearing means at and in alignment with one end of said receptacle and having an opening of a width substantially equal to that of the reduced width of said receptacle, said shearing means including a shear blade movable vertically across said opening to cut the compressed scrap; and ram means connected to said receptacle for moving the compressed scrap out of the receptacle and through said opening in said shearing means.*

*15. Apparatus defined in claim 14 wherein the ram means constitutes the end wall of the receptacle opposite the shearing means.*

*16. The structure defined in claim 14 in which the wall portion is mounted for pivotal movement toward the other side wall.*

*17. The structure defined in claim 14 including closure means for at least a portion of the top of the receptacle connected to and movable with the wall portion.*

*18. Apparatus for compressing and cutting bulky scrap metal objects and the like comprising: a box-like receptacle having a bottom wall main portion, movable wall means pivotally secured to opposite sides of said bottom wall main portion, said movable wall means having an open position wherein the bottom of said receptacle is defined by said bottom wall main portion and portions of said movable wall means and said receptacle is open at the top, whereby an object having a greater size than the width of said bottom wall main portion is receivable in said receptacle, and said movable wall means having a closed position wherein said bottom wall main portion constitutes the bottom of said receptacle and said movable wall means constitutes the sides and top thereof; means for moving said movable walls between said open and closed positions to compress an object in said receptacle; shearing means at one end of said receptacle in alignment with said bottom wall main portion and having an opening substantially the width of said receptacle when said movable wall means is in said closed position and a shear blade movable downwardly across said opening to cut the compressed object; and means connected to said receptacle to move an object compressed therein into said shearing means.*

*19. Apparaus for preliminarily compressing and subsequently cutting metal scrap into smaller pieces comprising: means defining an elongated charging box having side wall portions movable upwardly and inwardly for compressing scrap therebetween; shearing means mounted adjacent one end of said charging box means to cut pieces in sequence from one end to the compressed scrap in said charging box means; and means connected to said box for moving the scrap along said charging box and into said shearing means, said shearing means having an opening aligned with said box one end and through which the compressed scrap projects while being sheared, the width of said opening being substantially equal to that of said box when said wall portions are moved inwardly to their maximum extent.*

*20. Apparatus for preliminarily compressing and subsequently cutting into smaller pieces bulky metal scrap comprising: a box-like receptacle having an open-top, a bottom wall, and a pair of opposed upright side walls, said bottom wall including a main portion and an edge portion hinged thereto about an axis parallel to said side walls for pivotal movement between substantially horizontal and substantially upright positions and one of said side walls having at least a lower rigid portion fixedly secured to said bottom wall edge portion; reciprocating hydraulic motor means connected to said bottom wall edge portion for moving the latter and said one side wall lower portion upwardly and inwardly toward the other side wall for compressing metal scrap therebetween; shearing means at and having an opening aligned with one end, and of a width substantially equal to that, of said bottom wall main portion for reception of compressed scrap to be sheared, said shearing means including a fixed blade at the lower edge of said opening and a vertically movable blade cooperating with said fixed blade to cut metal scrap therebetween; and means connected to said receptacle for moving scrap compressed therein into said opening and between said blades into a position to be sheared.*

*21. The structure defined in claim 20 including a second bottom wall edge portion opposite the first mentioned edge portion and hinged to the main portion about an axis parallel to the side walls for movement between substantially horizontal and substantially upright positions, the other side wall having at least a lower rigid portion fixedly secured to said second edge portion, and reciprocating hydraulic motor means connected to said second edge portion for moving the latter and said other side wall lower portion upwardly and inwardly toward said first edge portion and one side wall lower portion for compressing scrap therebetween to a width substantially equal to that of said bottom wall main portion.*

*22. The structure defined in claim 21 wherein the combined heights of the side wall lower portions is substantially equal to the width of the bottom wall main portion.*

*23. The structure defined in claim 22 wherein the heights of the side wall lower portions are equal.*

References Cited in the file of this patent or the original patent

UNITED STATES PATENTS

| | | |
|---|---|---|
| 418,156 | Billings | Dec. 31, 1889 |
| 583,460 | Dederick | June 1, 1897 |
| 1,196,491 | Street | Aug. 29, 1916 |
| 2,690,115 | Sinclair | Sept. 28, 1954 |

FOREIGN PATENTS

| | | |
|---|---|---|
| 1,172,790 | France | Oct. 20, 1958 |
| 804,894 | Germany | May 4, 1951 |
| 567,645 | Italy | Oct. 14, 1957 |